United States Patent
Singh

(10) Patent No.: US 11,720,873 B2
(45) Date of Patent: Aug. 8, 2023

(54) SMART GLASS ORCHESTRATION ON CLOSE PROXIMITY ATMS

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 206 days.

(21) Appl. No.: 17/474,263

(22) Filed: Sep. 14, 2021

(65) Prior Publication Data

US 2023/0078916 A1  Mar. 16, 2023

(51) Int. Cl.
| | |
|---|---|
| G06Q 20/20 | (2012.01) |
| G08B 7/06 | (2006.01) |
| G06Q 40/02 | (2023.01) |
| G06Q 20/32 | (2012.01) |
| G07F 19/00 | (2006.01) |
| G06Q 20/38 | (2012.01) |
| H04L 9/40 | (2022.01) |
| H04L 9/32 | (2006.01) |
| H04L 9/08 | (2006.01) |
| G06F 3/01 | (2006.01) |
| H04R 1/08 | (2006.01) |

(Continued)

(52) U.S. Cl.
CPC .......... *G06Q 20/202* (2013.01); *G06F 3/011* (2013.01); *G06Q 20/1085* (2013.01); *G06Q 20/203* (2013.01); *G06Q 20/321* (2020.05); *G06Q 20/3224* (2013.01); *G06Q 20/3829* (2013.01); *G06Q 40/02* (2013.01); *G07F 19/209* (2013.01); *G07F 19/211* (2013.01); *G08B 7/066* (2013.01); *H04L 9/0861* (2013.01); *H04L 9/32* (2013.01); *H04L 63/0428* (2013.01); *H04L 67/52* (2022.05); *H04R 1/08* (2013.01)

(58) Field of Classification Search
CPC ............ G06Q 20/202; G06Q 20/1085; G06Q 20/203; G06Q 20/321; G06Q 20/3224; G06Q 20/3829; G06Q 40/02; G06F 3/011; G07F 19/209; G07F 19/211; G08B 7/066; H04L 9/0861; H04L 9/32; H04L 63/0428; H04L 67/52; H04R 1/08; H04W 4/021

See application file for complete search history.

(56) References Cited

U.S. PATENT DOCUMENTS

| | | | |
|---|---|---|---|
| 11,354,632 B1 * | 6/2022 | Hill | .................... G06K 7/10712 |
| 11,397,509 B1 * | 7/2022 | Clements | ............ G06F 3/04815 |

(Continued)

OTHER PUBLICATIONS

"Iristick.G1 Smart Safety Glasses," https://iristck.com/uploads/files/IRI-spec-sheet-Iristick.G1-32021-EU-final.pdf, Iristick, Mar. 2021.

*Primary Examiner* — Michael Jared Walker
(74) *Attorney, Agent, or Firm* — Weiss & Arons LLP

(57) ABSTRACT

This disclosure relates to an intelligent smart glasses that may be worn by a customer. The smart glasses may sense cash information on automated teller machine ("ATM"). The smart glasses may accordingly split up a cash transaction across various ATM units in close to proximity to the customer. The smart glasses may split a requested cash transactions among various ATMs so that if the desired amount/denomination of cash is not available at an ATM to the customer, the customer is seamlessly directed to one or more other ATMs that are capable of dispensing the desired amount of cash.

20 Claims, 6 Drawing Sheets

(51) Int. Cl.
*G06Q 20/10* (2012.01)
*H04L 67/52* (2022.01)

(56) References Cited

U.S. PATENT DOCUMENTS

| | | | |
|---|---|---|---|
| 2006/0239338 A1* | 10/2006 | Kolanek | H04L 27/0012 375/224 |
| 2015/0198446 A1* | 7/2015 | Perez | G06Q 20/1085 705/43 |
| 2016/0162869 A1* | 6/2016 | Gupta | G06Q 20/1085 705/43 |
| 2017/0053252 A1* | 2/2017 | Votaw | G06Q 20/40145 |
| 2017/0053284 A1* | 2/2017 | Votaw | G06Q 20/3278 |
| 2018/0204424 A1* | 7/2018 | Licht | G07F 19/211 |
| 2018/0300991 A1* | 10/2018 | Park | G06Q 20/3224 |
| 2021/0375103 A1* | 12/2021 | Chauhan | G07F 19/211 |

\* cited by examiner

SMART GLASS ORCHESTRATION ON CLOSE PROXIMITY ATMS

FIELD OF TECHNOLOGY

Aspects of the disclosure relate to using smart glasses in connection with an artificial intelligence engine to service customers by using two or more automated teller machines ("ATMs") to complete a cash transaction.

BACKGROUND

Currently there is no intelligent mechanism to inform customers whether a desired cash transaction is possible at an ATM or not. Conventionally, the customer must keep trying different ATMs to process their desired cash transaction.

Accordingly, there is a need to develop artificial intelligence apparatus and methods that identify target ATM units within a threshold proximity of a customer that collectively, have the capability to process the desired cash transaction. There is a need to develop intelligence methods that split a cash transaction among various ATMs to ensure the customer is able to complete the desired cash transaction. Accordingly, it is desirable to provide SMART GLASS ORCHESTRATION ON CLOSE PROXIMITY ATMS.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
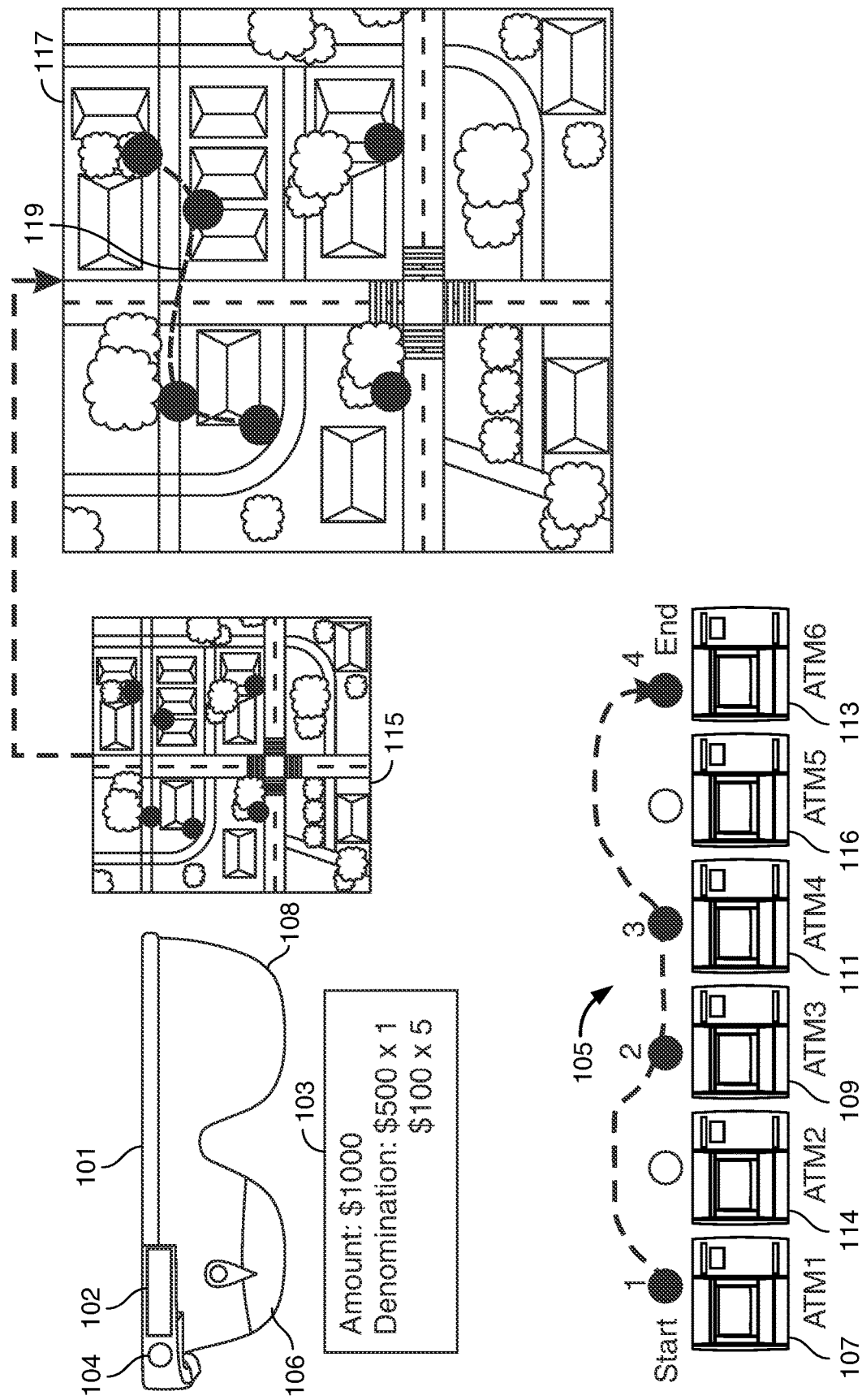
FIG. 1 shows illustrative apparatus and scenarios in accordance with the disclosure.

Apparatus and methods relate to intelligent smart glasses that may be worn by a customer. The smart glasses may divide a requested cash transactions among various ATMs so that if the desired amount/denomination of cash is not available at a nearest ATM unit, the customer is seamlessly directed to one or more other ATMs that are capable of dispensing the desired amount of cash.

The smart glasses may sense cash information at an ATM. Cash information may include cash inventory available at the ATM. Cash information may include a current capability of the ATM to process a cash withdraw or deposit. The smart glasses may divide a desired cash transaction into sub-transactions. The sub-transaction may be assigned to a sequence of ATMs. The sequence may include two or more different ATMs. The smart glasses may assign each sub-transaction to a different ATM. Each ATM in the sequence may be within a threshold distance of a current location customer. Each ATM in the sequence may be within a threshold distance of an ATM in the sequence assigned a prior sub-transaction.

Apparatus and methods generate the sequence of ATMs and guide the customer to each ATM in the sequence. An ATM Sequence Optimizing Engine ("SOE") intelligently may assemble a requested amount and denomination of cash desired by the customer into a sequence of transactions. The SOE may determine the sequence based on availability of cash at each ATM and current operational status associated with each ATM. Artificial intelligence ("AI") deep learning methods may be used to determine the sequence of transactions. The AI-deep learning methods may account for various factors including, cash availability at an ATM, time to cash replenishment at each ATM by third party vendors, ATM technical health parameters and movement/position of the customer relative to one or more ATMs.

At each of the ATM in the sequence, the customer may withdraw an amount of cash specified by the smart glasses. The smart glasses worn by the customer may authenticate the customer via a one-time smart glass validation procedure. After the initial authentication, an ATM unit may authorize a release of cash to a customer based on a hashed sequence code received from the smart glasses worn by the customer. The smart glasses may confirm that they are being worn by the customer based on constant checking of a biometric characteristic, such as an iris scan.

An ATM unit may be configured to sense proximity of the smart glasses to the ATM unit. In some embodiments, the ATM unit may only dispense cash when the customer acknowledges a physical presence at the ATM. The customer may acknowledge their physical presence by entering information using a keypad or touch screen of the ATM.

The system may include equipping each ATM unit with an ultra-high frequency ("UHF") radio beacon. The UHF beacon may broadcast location information associated with each ATM. The UHF beacon may broadcast cash inventory information associated with an ATM unit. The UHF beacon may broadcast an operational status of one or more ATM components. The smart glasses may sense a capability of each ATM unit to dispense cash by capturing information broadcast by one or more UHF beacons. The SOE may apply deep learning methods to predict ATM availability to dispense cash based on current cash inventory, ATM location and ATM functionality and health parameters.

The SOE may provide real time ATM sequence orchestration while a customer is navigating to ATMs in a sequence using the smart glasses. The SOE may recalculate or recalibrate an ATM sequence based on detected real-time conditions. Such real time conditions may include traffic patterns, changes in ATM operational status (e.g., cash dispensing mechanism not operational) and actions by third parties, including cash withdrawals and replenishments.

For the purposes of this disclosure, a smart glasses device, referred to alternately herein as "smart glasses," may be understood to mean wearable glasses including one or more internal processors. The one or more internal processors may include one or more microprocessors. In addition to the processors, the smart glasses may also include hardware components associated with conventional glasses. Such components may include a frame and lenses.

Other components of the smart glasses may include one or more displays, one or more cameras, one or more video cameras, one or more audio input devices, one or more audio output devices and/or one or more wired and/or wireless communication circuits (e.g., Bluetooth®, Beacon®, cellular). The communication circuit may provide cellular telecommunication capabilities. A location of the smart glasses may be determined using cellular triangulation techniques.

The processor(s) of the smart glasses may execute one or more software modules. Software modules may be stored in a memory located within the smart glasses. Software modules may, in the alternative, be referred to as applications. Applications, when executed by the processor(s), may enable the smart glasses to perform various tasks and functions. Exemplary applications may include video capture, customer authentication, sequence generation, navigation, object recognition and running AI computational models.

The display of the smart glasses may present information alongside the physical environment the customer sees through the lenses. The smart glasses display may be physically configured to add data alongside or overlaid on the physical environment the customer sees through the lenses. Such a display may be referred to herein as a "heads up display" or "HUD." A HUD may present information to the customer in a manner that does not require the customer to turn away from a viewpoint through the lenses.

In some embodiments, the HUD display of the smart glasses may project data as an at least partially transparent overlay onto the lenses. In some embodiments, the projected overlay may not be transparent. A customer wearing the smart glasses may view the physical environment normally seen through lenses in addition to the data included in the overlay. Such an overlay may be referred to herein as augmented reality.

Various sensors may be included in the smart glasses. These sensors may include a global positioning system ("GPS") receiver, a moisture sensor, a voltage meter, an accelerometer, a gyroscope, a touch pad and any other suitable sensors. The smart glasses may include a video camera. The smart glasses may include a network interface card. The network interface card may establish communication with a network. The network interface card may be operable to transmit a data packet over a wireless communication channel. The network interface card may be operable to transmit a data packet over a wired communication channel. The data may be transferred over the network to a remote server, ATM or other destination.

The smart glasses may include a battery. The battery may be operable to power hardware components of the smart glasses, such as the sensors, the microprocessor and the display and the nano wireless network interface card. The smart glasses may include any suitable power supply. The smart glasses may include a solar panel and may be connectable to other power sources.

An artificial intelligence ("AI") system for linking two or more automated teller machines ("ATMs") to provide synchronized and sequential ATM functionality to a customer is provided. The system may include smart glasses. The smart glasses may include a HUD that implements augmented reality. The smart glasses may capture a customer voice command or other input instructions to perform a target action. The target action may be a cash withdrawal. For example, the smart glasses may include a microphone. The microphone may capture a voice command specifying a desired amount and denomination of bills. The target action may be any suitable cash transaction that can be performed at an ATM.

The smart glasses may include a geolocation circuit such as a GPS receiver. The geolocation circuit may determine a position of the smart glasses at a time the microphone captures the customer voice command. The smart glasses may include a touchpad. The smart glasses may include a communication circuit. The communication circuit may transmit and receive encrypted communication signals.

The system may include a network of ATMs. Each ATM on the network may include a local AI engine. The local AI engine may monitor functional capabilities of the ATM on which is resides. The local AI engine may monitor capabilities of the ATM to dispense cash or receive cash deposits. The local AI engine may monitor a cash inventory present in the ATM. The local AI engine may monitor when the ATM is expected to be resupplied with cash. Each ATM on the network may include a radio beacon. The functional capabilities determined by the local AI engine may be broadcast to the smart glasses and other ATMs using the radio beacon.

The system may include a remote computer server. The remote computer server may include a remote AI engine. The remote AI engine may receive, from the smart glasses, a target geolocation of the smart glasses. The remote AI engine may receive the customer's target action entered using the smart glasses.

Based on the target geolocation received from the smart glasses and functional capabilities of each ATM in the network, the remote AI engine may compute an operational sequence for achieving the target action. The computed operational sequence may utilize a first ATM in the network to perform a first stage of the target action and a second ATM in the network to perform a second stage of the target action. The first stage may include withdrawal of a first amount of cash in desired denominations and/or desired currency. The first stage may include withdrawal of a second amount of cash in desired denominations and/or desired currency.

The system may issue instructions to a heads-up display of the smart glasses to visually guide the customer from a current position of the smart glasses to the first ATM and from the first ATM to the second ATM. The remote AI engine may determine the first ATM in the operational sequence based on whether there is at least one other ATM within a threshold distance of the first ATM that can also perform the first stage of the target action. This computation ensures that if another customer utilizes the first ATM in a manner that prevents the first stage from being executed at the first ATM, the AI engine may direct the customer to the other ATM capable of performing the first stage.

For example, another customer may access the first ATM and withdraw a large sum of cash before the first stage is executed at the first ATM. The large withdrawal may not leave enough cash in the first ATM to complete the first stage on behalf of the requesting customer. In such a scenario, the AI engine may dynamically redirect the customer to the other nearby ATM to complete the first stage.

The remote AI engine may determine the first ATM based on whether there is at least one other ATM within a threshold distance of the second ATM that can perform the first stage of the target action. This computation ensures that if another customer utilizes the first ATM in a manner that prevents the first stage from being executed at the first ATM, the AI engine may direct the customer to the other ATM capable of performing the first stage that is also nearby to the second ATM in the sequence. The AI engine may direct the customer to the other ATM that is close proximity to the second ATM that will be needed to perform the second stage of the transaction.

The remote AI engine may determine a first ATM that is not the closest ATM in the network to the position of the smart glasses. However, a closer ATM may not be capable of completing the customer's desired cash transaction. Therefore, the remote AI engine may not direct the customer to the closer ATM. For example, the closer ATM may not be capable of completing the first stage of the desired cash transaction. The closer ATM may be further away from a second ATM that will be needed to complete a second stage of the desired cash transaction.

The local AI engine that resides on the second ATM may transmit an update on functional capabilities of the second ATM. The second ATM may broadcast its functional capabilities using a radio beacon. The smart glasses may receive the broadcast from the second ATM. The smart glasses may retransmit the received broadcast to the remote AI engine. In response to receiving the update, the remote AI engine may reroute the smart glasses to a third ATM instead of the second ATM.

The functional update received from the second ATM may indicate that the second ATM is no longer capable of performing the second stage of the desired cash transaction. In some embodiments, when the second ATM is part of an operational sequence, the local AI engine may transmit updates on functional capabilities more frequently than otherwise. This may ensure that as soon as a functional change is detected, the remote AI engine may take action to reroute the customer to an ATM that is capable of completing the second stage of the target action.

The smart glasses may capture authentication information from the customer. The authentication information may include credentials needed to authenticate the customer at the first ATM. The smart glasses may transfer the authentication information to the first ATM. The smart glasses may transfer the authentication information to the first ATM when the smart glasses detect that the customer is within a threshold distance of the first ATM. For example, the smart glasses may only initiate the transfer of credentials when within an NFC range (e.g., ~3 inches). In some embodiments, the smart glasses may only transfer the credentials after the customer physically contacts the ATM (e.g., by pressing a key on an ATM keypad).

The local AI engine on the first ATM may authenticate the customer based on the credentials received from the smart glasses. In response to successfully authenticating the customer based on the received credentials, the local AI engine on the first ATM may generate a cryptographical key. The first ATM may transfer the cryptographical key to the smart glasses. The first ATM may use NFC to transfer the cryptographic key to the smart glasses. The first ATM may transfer the cryptographical key to the second ATM using a communication network linking the first and second ATMs.

After successfully completing the first stage at the first ATM, the smart glasses may direct the customer to the second ATM in the operational sequence. The local AI engine on the second ATM may receive a request from the smart glasses to access the second ATM. In response to the access request received from the smart glasses, the second ATM may request that the smart glasses provide the cryptographical key generated by the first ATM. In response to receiving the cryptographical key from the smart glasses, the second ATM may provide the customer access to the second ATM. The second ATM may provide the customer access to the second ATM without the customer having to physically input any authentication information or perform any other action at the second ATM.

An operational sequence for achieving the target action may be a primary operational sequence. The remote AI engine may determine a secondary operational sequence for achieving the target action. The remote AI engine may transfer the primary and the secondary operational sequences to the smart glasses. The remote AI engine may first initiate execution of the primary operational sequence on the smart glasses. In response to a request from the customer, the smart glasses may abort execution of the primary operational sequence. The smart glasses may initiate execution of the secondary operational sequence.

For example, the customer may have a change in plans that requires the customer to travel in a different direction. The customer may find the ATMs in the primary sequence difficult to access. For example, the customer may need to navigate heavy traffic to access the first ATM. The customer may request an alternative operational sequence to achieve the target transaction. In response to such a request, the system may trigger execution of the secondary operational sequence.

The remote AI engine may detect that the first stage of the target action has been successfully performed at the first ATM performs. In response to detecting successful performance of the first operational sequence, the remote AI engine may issue instructions to a local AI engine running on the second ATM. The issued instructions may restrict any actions at the second ATM that will prevent successful execution of the second stage of the target action at the second ATM. For example, the issued instructions may prevent another customer from withdrawing cash from the second ATM that would not leave enough cash to execute the second stage of the target action.

The remote AI engine may determine an estimated travel time for the customer to progress from the first ATM to the second ATM. The remote AI engine may detect a change in circumstances that may cause the customer to exceed the estimated travel time. Illustrative changes in circumstances may include actual or expected traffic delays. Illustrative changes in circumstances may include weather patterns or expected weather patterns. In response to detecting the change in circumstances, the remote AI engine may reroute the customer to a third ATM instead of the second ATM. Using the third ATM to perform the second stage may allow the customer to complete the target action within the estimated travel time.

An artificial intelligence ("AI") method for providing a customer with synchronized and sequential functionality utilizing at least two automated teller machine ("ATMs") on a network is provided. Methods may include capturing a target action input by a customer wearing smart glasses. The target action may be a cash transaction. Based on a current geographic location of the smart glasses, methods may include determining an operational sequence for achieving the target action.

The operational sequence may utilize a first ATM on the network to perform a first stage of the target action and a second ATM on the network to perform a second stage of the target action. Determining the operational sequence may include verifying that the first and second ATMs each have a functional capability to perform the first and second stages of the operational sequence.

Methods may include issuing instructions to a heads-up display of the smart glasses. The heads-up display may visually guide the customer along a route from the current geographic position to the first ATM and from the first ATM to the second ATM. Methods may include determining a first expected time for completing the first stage of the target action. Methods may include determining a second expected time for completing the second stage of the target action.

Before issuing the instructions to the heads-up display, methods may include verifying that the first ATM will have a functional capability to perform the first stage of the target action at the first expected time. Before issuing the instructions to the heads-up display, methods may include verifying that the second ATM will have a functional capability to perform the second stage of the target action at the second expected time.

After successfully performing the first stage at the first ATM, methods may include generating a cryptographic key pair. The cryptographic key pair may include a public key and a private key. Methods may include storing the private key on the smart glasses. Methods may include storing the public key on the second ATM.

In response to receiving a request from the smart glasses to access the second ATM, methods may include using the public key to verify the private key stored locally on the smart glasses. In response to successfully verifying the private key stored locally on the smart glasses, methods may include performing the second stage of the target action at the second ATM without requiring the customer to input any authentication information or perform any other action at the second ATM.

Methods may include associating a creation time with the public key. Methods may include rejecting a request from the smart glasses for access to the second ATM when the access request is received by the second ATM before a threshold time delay has elapsed after the creation time. The threshold time delay may be computed to provide a minimal amount of time for the customer to travel from the first ATM to the second ATM. Imposing the threshold time delay provides a security measure that prevents fraudulently initiated operational sequences (e.g., skipping the first stage).

Methods for determining the operational sequence may include computing a series of checkpoints along the route from the first ATM to the second ATM. Methods may include authenticating the smart glasses as they pass within a threshold distance of each checkpoint. Authenticating in this context may refer to the smart glasses passing within a target distance of a checkpoint. Distance between a checkpoint and the smart glasses may be measured based on whether the smart glasses are within a communication range of the checkpoint. For example, an illustrative communication range for Bluetooth communication may be about 50 meters.

Distance between a checkpoint and the smart glasses may be measured based on strength of a communication signal received by the checkpoint from the smart glasses. An illustrative checkpoint may be a network node. The checkpoints may be ATMs operated by other entities. The checkpoints may be Wi-Fi hotspots or cellular transceivers.

After successfully authenticating the smart glasses at the checkpoints, methods may include performing the second stage of the target action at the second ATM without requiring the customer to input authentication information to access the second ATM. The very fact that the smart glasses have traveled along a route associated with an operational sequence (as verified by the checkpoints) may provide a layer of authentication for a subsequent transaction or transaction stage.

Methods may include replacing the second ATM in the operational sequence with a third ATM in the network to perform the second stage of the target action. Methods may include dynamically issuing instructions to the heads-up display of the smart glasses that visually guide the customer from the first ATM to the third ATM.

Methods may include determining an estimated travel time for the customer to progress from the first ATM to the second ATM. Methods may include detecting a change in circumstances. The change in circumstances may cause the customer to exceed the estimated travel time. In response to detecting the change in circumstances, methods may include replacing the second ATM in the operational sequence with the third ATM. Directing the customer to the third ATM may ensure the customer completes the operation sequence within the estimated travel time. Directing the customer to the third ATM may ensure the customer completes the operation sequence within threshold amount of time after expiration of the estimated travel time.

An artificial intelligence ("AI") software engine is provided for implementing synchronized and sequential functionality of at least two automated teller machine ("ATMs") on a network. The AI software engine may be run on a computer system. The computer system may include a processor circuit. The processor circuit may control overall operation of the computer system. A processor circuit may include hardware, such as one or more integrated circuits that form a chipset. The hardware may include digital or analog logic circuitry configured to perform any suitable (e.g., logical) operation.

The computer system may include one or more of the following illustrative hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

The computer system may include RAM, ROM, an input/output ("I/O") module and a non-transitory or non-volatile memory. Machine-readable memory may be configured to store information in machine-readable data structures. The I/O module may include a microphone, button(s) and/or touch screen which may accept customer-provided input. The I/O module may include one or more of a speaker for providing audio output and a video display for providing textual, audiovisual and/or graphical output.

Software applications executed by the computer system may be stored within the non-transitory memory and/or other storage medium. Software applications may provide instructions to the processor that enable the computer system to perform various functions. For example, the non-transitory memory may store software applications such as the AI software engine, an operating system, application programs, machine learning algorithms and an associated database. Alternatively, some or all of computer executable instructions of a software application may be embodied in hardware or firmware components of the computer system.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. The computer system may be operational with distributed computing environments where tasks are performed by remote processing devices that are linked through a communications network. In a distributed computing environment, program modules may be located in both local and remote computer storage media including memory storage devices. Computer systems may rely on a network of remote servers hosted on the Internet to store, manage, and process data (e.g., "cloud computing" and/or "fog computing").

A computer system may be part of two or more networks. A computer system may support establishing network connections to one or more remote computing systems. Illustrative network connections may include a local area network ("LAN") and a wide area network ("WAN"). When used in a LAN networking environment, a computer system may be connected to the LAN through a network interface or adapter. A computer system may include a communication circuit. The communication circuit may include a network interface card or adapter.

When used in a WAN networking environment, a computer system may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and a computer system may be operated in a client-server configuration to permit a user to retrieve web pages from a web-based server. Web browsers can be used to display and manipulate data on web pages.

Computer systems may include components, such as a display, battery, speaker, and antennas. Components of a computer system may be linked by a system bus, wirelessly or by other suitable interconnections. Components of a computer system may be present on one or more circuit boards. In some embodiments, the components may be integrated into a single chip. The chip may be silicon-based.

The AI software engine may include computer executable instructions, that when executed on the processor on the computer system perform one or more actions. The actions may include receiving a customer command to perform a target action. The target action may be to perform a desired cash transaction at an ATM. The actions may include generating an operational sequence that utilizes two or more ATMs to perform the target action.

The operational sequence may be generated based on cash availability at ATMs on the network. The operational sequence may be generated based on time until an expected cash replenishment at one or more ATMs on the network. The operational sequence may be generated based on an operational status of ATM components needed to perform the target action. The operational sequence be generated based on expected health parameters or operational status one or more ATMs on the network.

The AI software engine may determine an estimated travel time for the customer to complete the target action. The AI software engine may detect a change in circumstances that will cause the customer to exceed the estimated travel time. In response to detecting the change in circumstances, the AI software engine may change the operational sequence. The change in the operational sequence may include altering the identity of the two or more ATMs in the operational sequence.

The AI software engine may require the customer to input authentication information to access a first ATM in the operational sequence. In response to successfully authenticating the customer at the first ATM, the AI software engine may provide the customer access to a second ATM in the operational sequence without requiring the customer to input authentication information at the second ATM.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative smart glasses 101. Smart glasses 101 include video capture device 104. Smart glasses 101 include projection display 102. Projection display 102 may project information 106 onto lenses 108. Projection display 102 may present information on lenses 108 alongside what the customer sees through lenses 108. In some embodiments, smart glasses 101 may present information 106 as a transparent projection onto lenses 108. In such embodiments, a customer may view, through information 106, physical objects that are normally seen through lenses 108. In some embodiments, information 106 may not be a transparent projection.

FIG. 1 shows that a customer wearing smart glasses has entered desired target action 103. An AI software engine has computed operational sequence 105. The AI software engine may be run on smart glasses 101. The AI software engine may be run on a remote computer system. Operational sequence 105 utilizes ATMs 107, 109, 111 and 113 to complete the customer's desired target action. Operational sequence 105 skips over ATMs 114 and 116. ATMs 114 and 116 may not have sufficient cash inventory to perform one or more stages of the operational sequence. ATMs 114 and 116 may not have components that are operational to perform one or more stages of desired target action 103.

Map 115 shows geographic locations of ATMs 107, 114, 109, 111, 116 and 113. Map 117 shows illustrative route 119 that smart glasses will direct the customer to follow. Following illustrative route 119 will take customer to ATMs 107, 109, 111 and 113 to complete desired target action 103. A location and directions to each ATM in the operational sequence may be presented to the customer by information 106.

Figure 2:
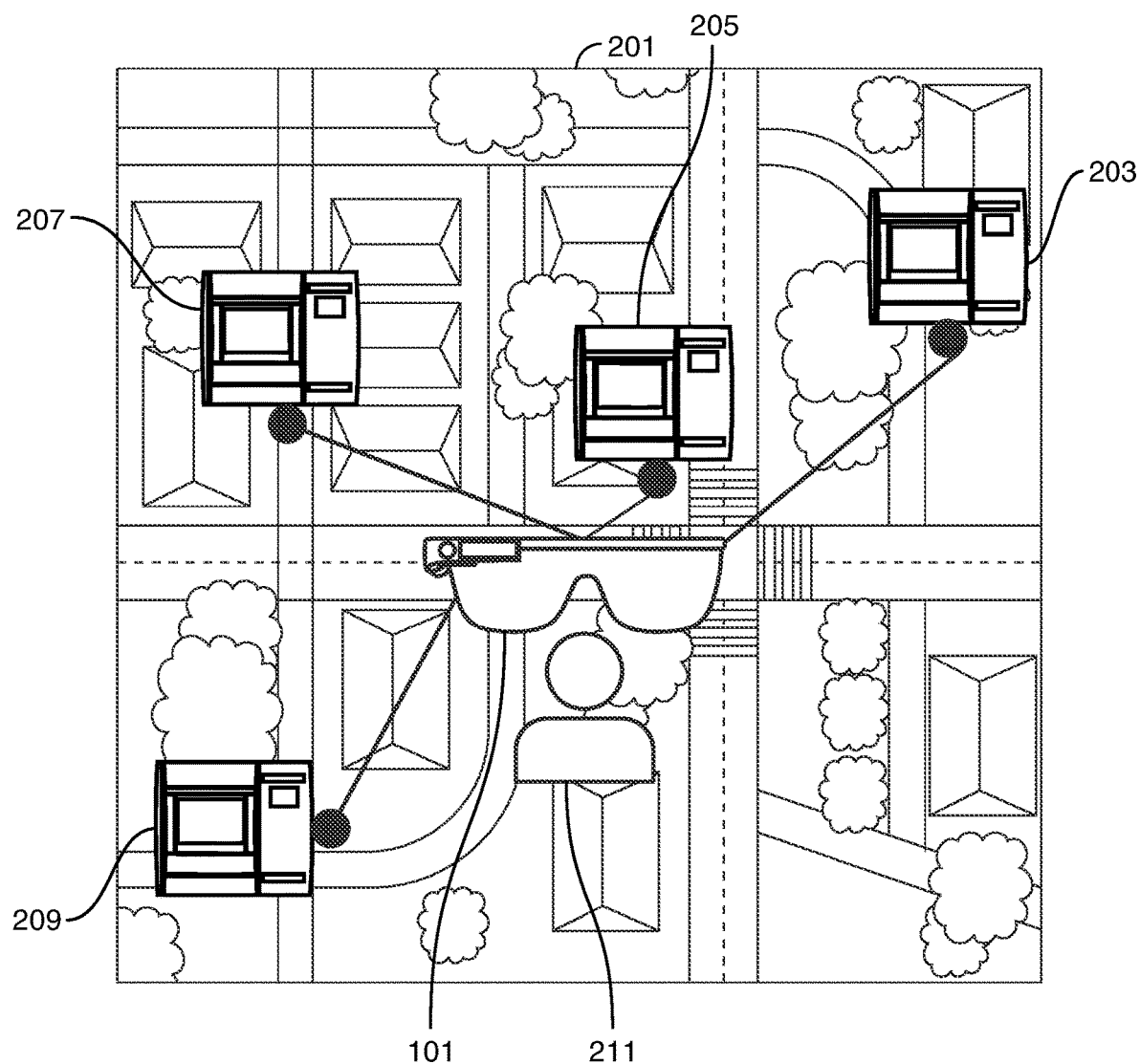
FIG. 2 shows illustrative apparatus and scenario in accordance with the disclosure.

FIG. 2 shows illustrative communication between ATMs in a network and smart glasses 101 worn by customer 211. Each of the ATMs 203, 205, 207 and 209 may be equipped with a radio beacon. Smart glasses 101 may include a communication circuit that receives signals broadcast by the radio beacons. The signals broadcast by the radio beacons may include real-time functional capabilities of the ATMs. Such functional capabilities may include cash inventory, time to cash replenishment and operational status of components. Such operational status may include whether the ATM is able to dispense cash.

Based on the broadcast signals, smart glasses 101 may compute a series of checkpoints along route (such as route 119 shown in FIG. 1) for implementing a computed operational sequence. ATMs that are not part of the operational sequence (e.g., ATMs 114 and 116, shown in FIG. 1) may still function as checkpoints along route 119. As customer 211 wearing smart glasses 101 travels from a first ATM in an operational sequence to a second ATM in the operational sequence, smart glasses 101 may communicate with the checkpoints. Smart glasses 101 may communicate with the ATM checkpoint by confirming receipt of signals broadcast by the checkpoint's radio beacon.

Communication with a checkpoint ATMs may serve to progressively authenticate smart glasses 101 as they pass within a threshold distance of each checkpoint. Distance to a checkpoint may be determined based on strength of a signal received by smart glasses 101. Smart glasses 101 may register a stronger (e.g., higher power signal) when smart glasses are closer to a checkpoint. Smart glasses 101 may register a weaker (e.g., lower power signal) when smart glasses are further away from a checkpoint.

An ATM in the operational sequence may be informed that the smart glasses have been successfully authenticated at a threshold number of checkpoints. After successfully authenticating smart glasses 101 at the threshold number of checkpoints, smart glasses 101 may be granted access to an ATM in the operational sequence without the customer inputting authentication information (e.g., card and/or PIN) to access the ATM.

Figure 3:
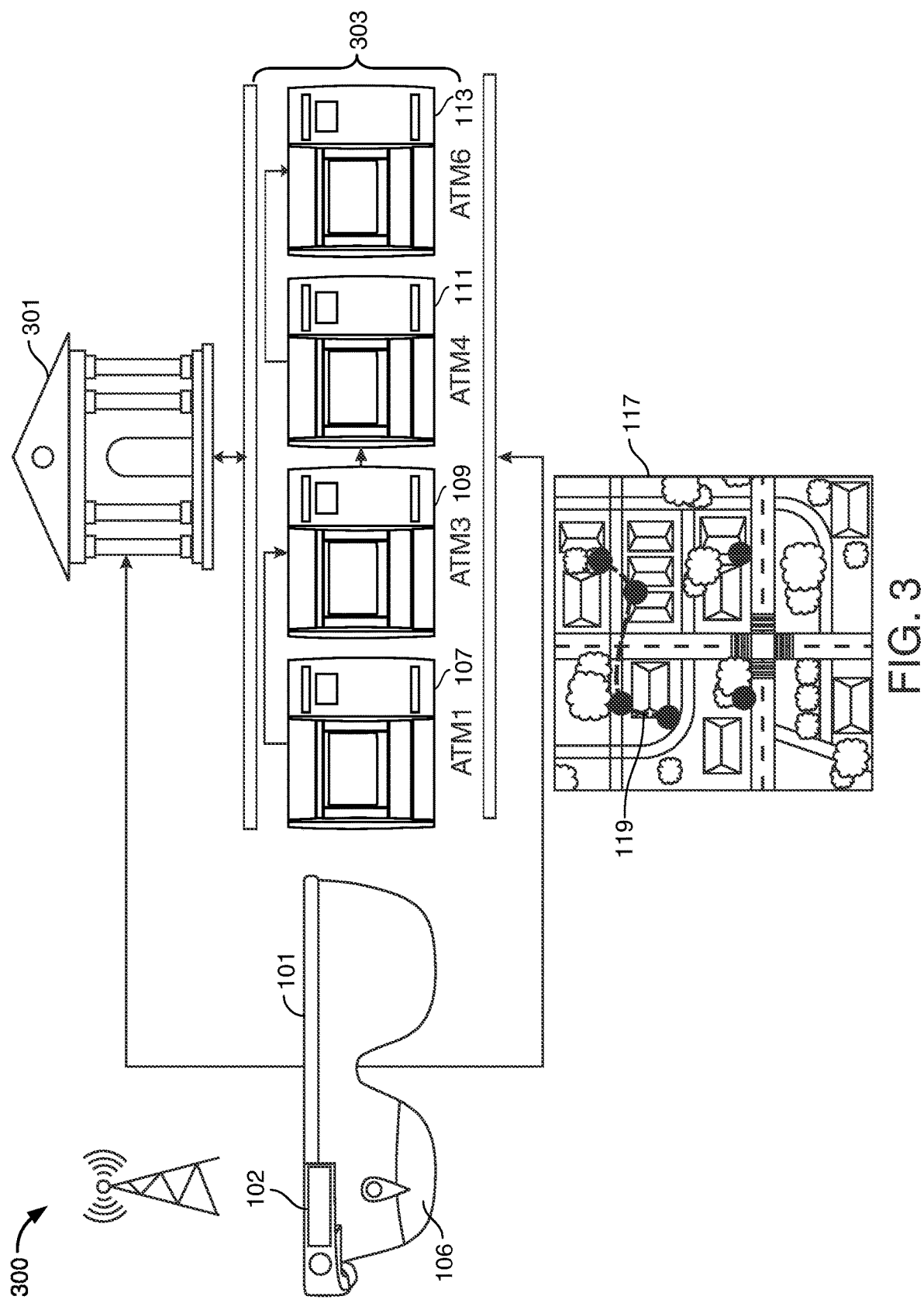
FIG. 3 shows illustrative apparatus and scenario in accordance with the disclosure.

FIG. 3 shows illustrative process flow 300. In process flow 300, smart glasses 101 receives signals broadcast by ATMs in network 303. The signals may include operational status, cash inventory or other information about each ATM. In some embodiments, smart glasses 101 may relay the information captured from the broadcast signals to remote ATM hub 301. In some embodiments, remote ATM hub 301 may receive the broadcast signals directly from ATMs in network 303.

Remote ATM hub 301 may run a remote AI engine. The remote AI engine may receive a current geolocation of smart glasses 101. The remote AI engine may receive a target action desired by a customer wearing smart glasses 101. Based on the current geolocation received from smart glasses 101 and information received from each ATM in network 303, the remote AI engine may compute an operational sequence for achieving the target action. The remote AI engine may issue instructions to display 102 of smart glasses 101 that generates information 106 presented by smart glasses 101. Information 106 visually guides the customer from the current geolocation of smart glasses 101 along route 119. Route 119 guides the customer to two or more ATMs in network 303 to implement the operational sequence computed by the remote AI engine.

Figure 4:
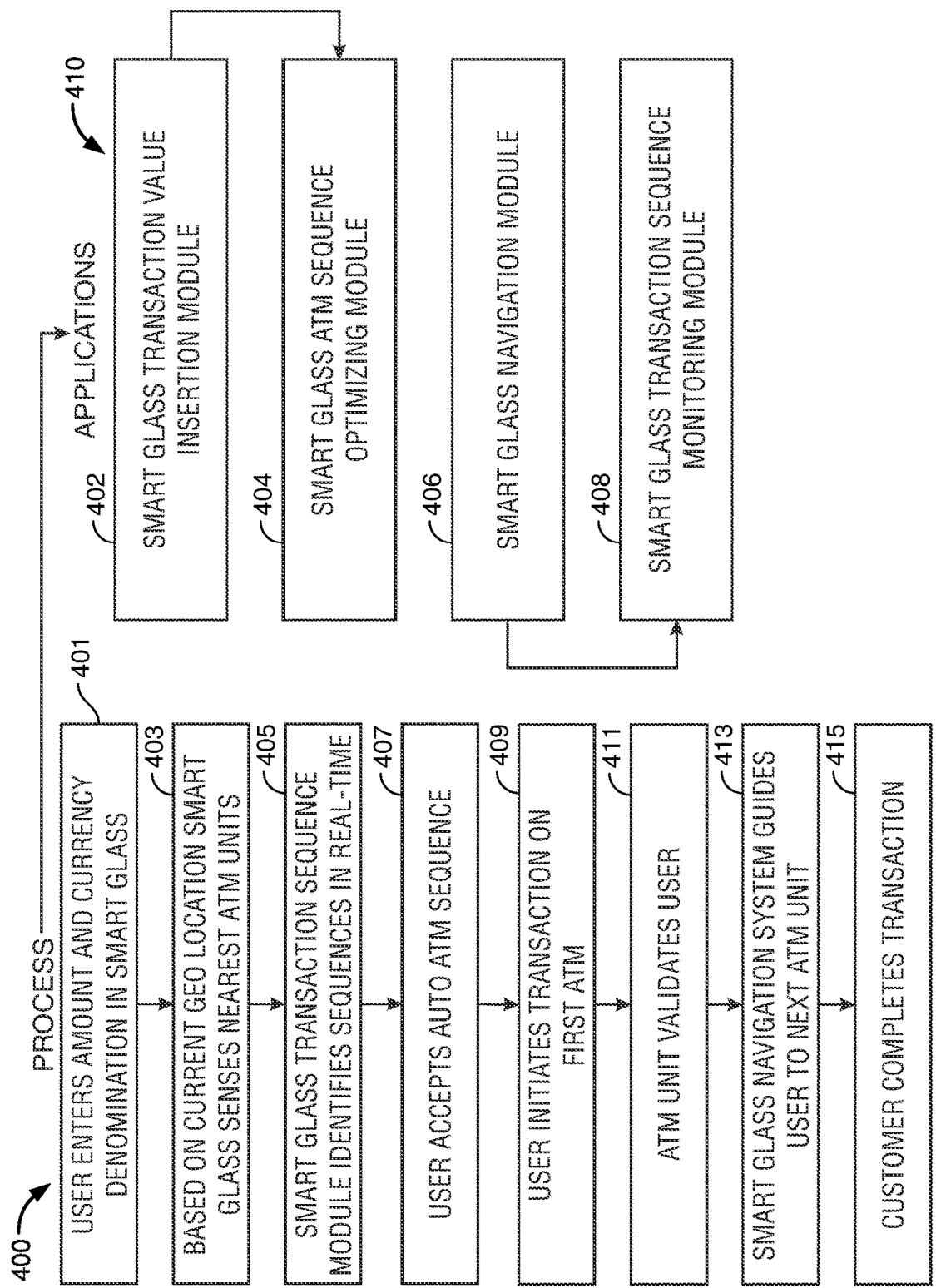
FIG. 4 shows an illustrative process and associated apparatus in accordance with the disclosure.

FIG. 4 shows illustrative process 400. FIG. 4 also shows illustrative computer applications 410 for implementing process 400. Process 400 and computer applications 410 will be described as being illustratively implemented by smart glasses 101. In some embodiments, process 400 and computer applications 410 may be implemented on smart glasses 101 (shown in FIG. 1). In some embodiments, process 400 and computer applications 410 may be implemented by ATM hub 301 (shown in FIG. 3). In some embodiments, process 400 computer applications 410 may be implemented by one or more ATMs in network 303 (shown in FIG. 3). In some embodiments, process 400 computer applications 410 may be executed by a distributed computing environment where tasks are performed by remote processing devices that are linked through a communications network.

Process 400 begins at step 401. At step 401, a customer enters a target action. Smart glass transaction value insertion module 402 may provide a user interface that allows the customer to enter details of the target action. Details of the target action may include a desired cash amount, desired currency and desired denomination.

At step 403, based on a current geolocation of smart glasses 101, smart glasses 101 senses which ATMs are within a threshold distance of the current geolocation. At step 405, smart glasses 101 utilizes smart glass ATM sequence optimizing module 404 to compute an operational sequence for executing the target action. Smart glasses 101 may compute the operational sequence based on real-time functional capabilities of each ATM in the network.

At step 407, the customer wearing smart glasses 101 is presented with and accepts the computed operational sequence. At step 409, smart glasses 101 guide the customer to a first ATM. At the first ATM, the customer initiates a first stage of the target action. For example, during the first stage, the customer may provide authentication information to the first ATM. At step 411, the first ATM validates the customer. The first stage may include withdrawal of a first amount of cash in desired denominations.

After the customer completes the first stage of the target action, smart glasses 101 guides the customer along a route (e.g., route 119 shown in FIG. 1) to a second ATM. Smart glasses 101 may utilize smart glass navigation module 406 to compute a route for the customer that guides the customer to the ATMs in the operational sequence.

Smart glass navigation module 406 may capture for real-time traffic conditions in the vicinity of smart glasses 101 and in the vicinity of ATMs in the accepted operational sequence. Smart glass navigation module 406 may also account for real-time functional capabilities of ATMs in the network. Based on information captured smart glass navigation module 406, smart glass transaction sequence monitoring module 408 may generate real-time changes to the operational sequence.

Smart glass transaction sequence monitoring module 408 may detect a change in circumstances that will cause the customer to exceed the estimated travel time associated with completing the operational sequence. In response to the change in circumstances, sequence optimizing module 404 may reroute the customer to follow a secondary operational sequence for achieving the target action. The secondary operational sequence may be more likely to achieve the target action within the estimated travel time.

At step 413, smart glass navigation module 406 guides the customer to subsequent ATMs. For example, the customer may execute a second stage of the target action at a second ATM. The second stage may include withdrawal of a second amount of cash in desired denominations. At step 415, the customer completes the target action.

Figure 5:
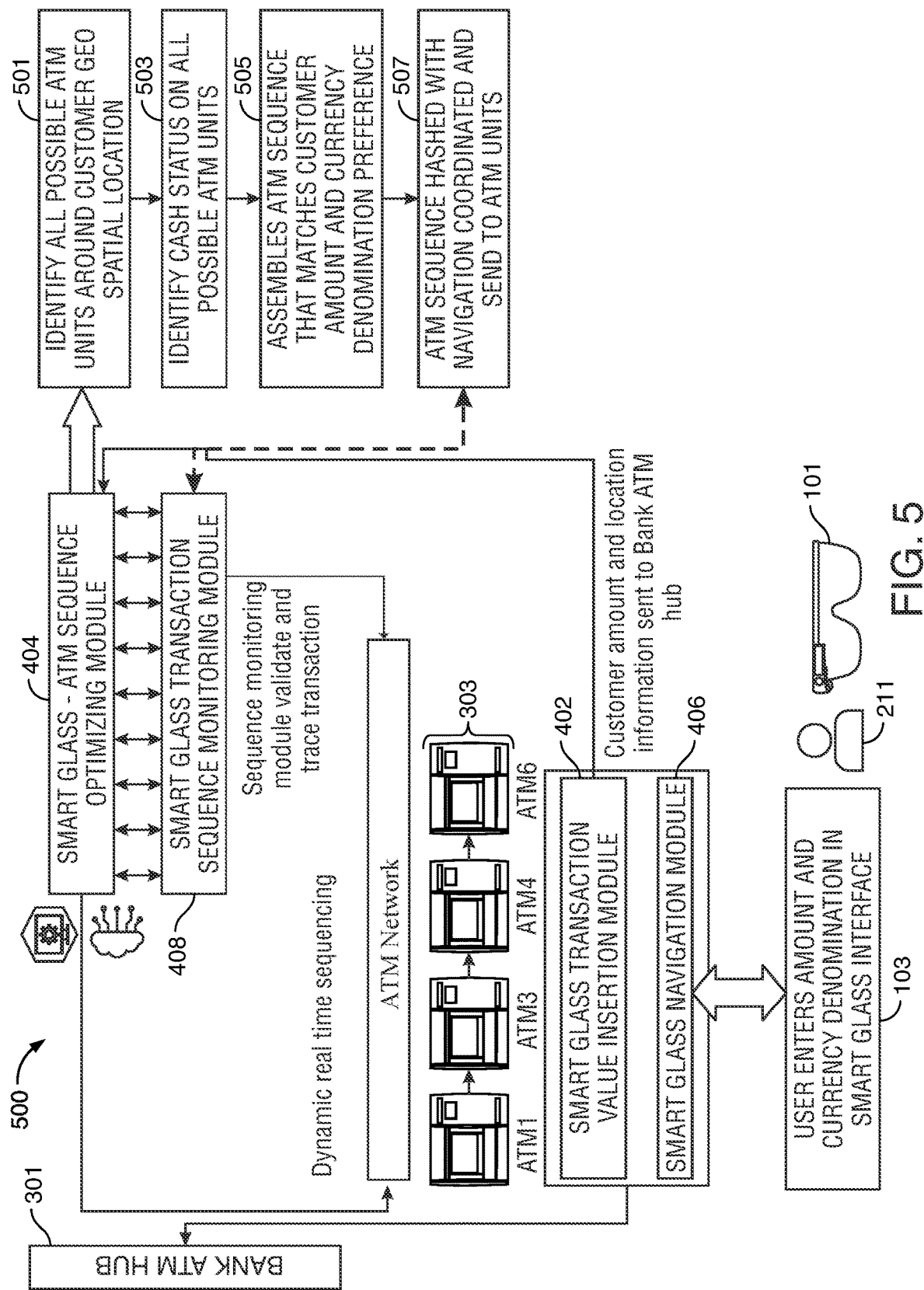
FIG. 5 shows illustrative apparatus and scenario in accordance with the disclosure.

FIG. 5 shows illustrative system architecture 500. System architecture 500 shows illustrative interactions among hardware and software components shown in FIGS. 1, 2, 3 and 4. FIG. 5 also shows an illustrative outputs generated by interaction among components of system architecture 500.

Output 501 shows that interaction between smart glasses 101 and bank ATM hub 301 identifies all possible ATM units in network 303 and within a threshold distance of a current geolocation of smart glasses 101. Output 503 shows that interaction between smart glasses 101 and bank ATM hub 301 identifies a cash status of all possible ATM units in network 303. "Cash status" may include cash inventor in an ATM, operational status of one or more ATM components and a cash replenishment schedule for an ATM. Output 505 shows that interaction between smart glasses 101 and bank ATM hub 301 provides information that is utilized by an AI engine to compute an operational sequence for the customer amount and currency denomination associated with target action 103 (shown in FIG. 1).

Output 507 shows that interaction between smart glasses 101 and bank ATM hub 301 allows smart glasses 101 to access ATMs in network 303 based on hash values of the operational sequence and navigation coordinates. For example, after smart glasses access a first ATM in network 303, other ATMs in network 303 may allow customer 211 access based on a hashed sequence code received from the smart glasses 101 worn by customer 211. Smart glasses 101 may confirm that it is being worn by customer 211 based on constant checking of a biometric characteristic, such as an iris scan.

An ATM in network 303 may be configured to sense proximity of smart glasses 101 to itself or another ATM. In some embodiments, in addition to a hashed sequence code, an ATM may only dispense cash when customer 211 confirms a presence at the ATM. Such presence may be confirmed by customer 211 pressing a button on a keypad of the ATM. Interaction between smart glasses 101 and bank ATM hub 301 may cause projection display 102 (shown in FIG. 1) to project information onto lenses 108 (also shown in FIG. 1) that instructs customer 211 to press a specific button on the keypad of an ATM.

Figure 6:
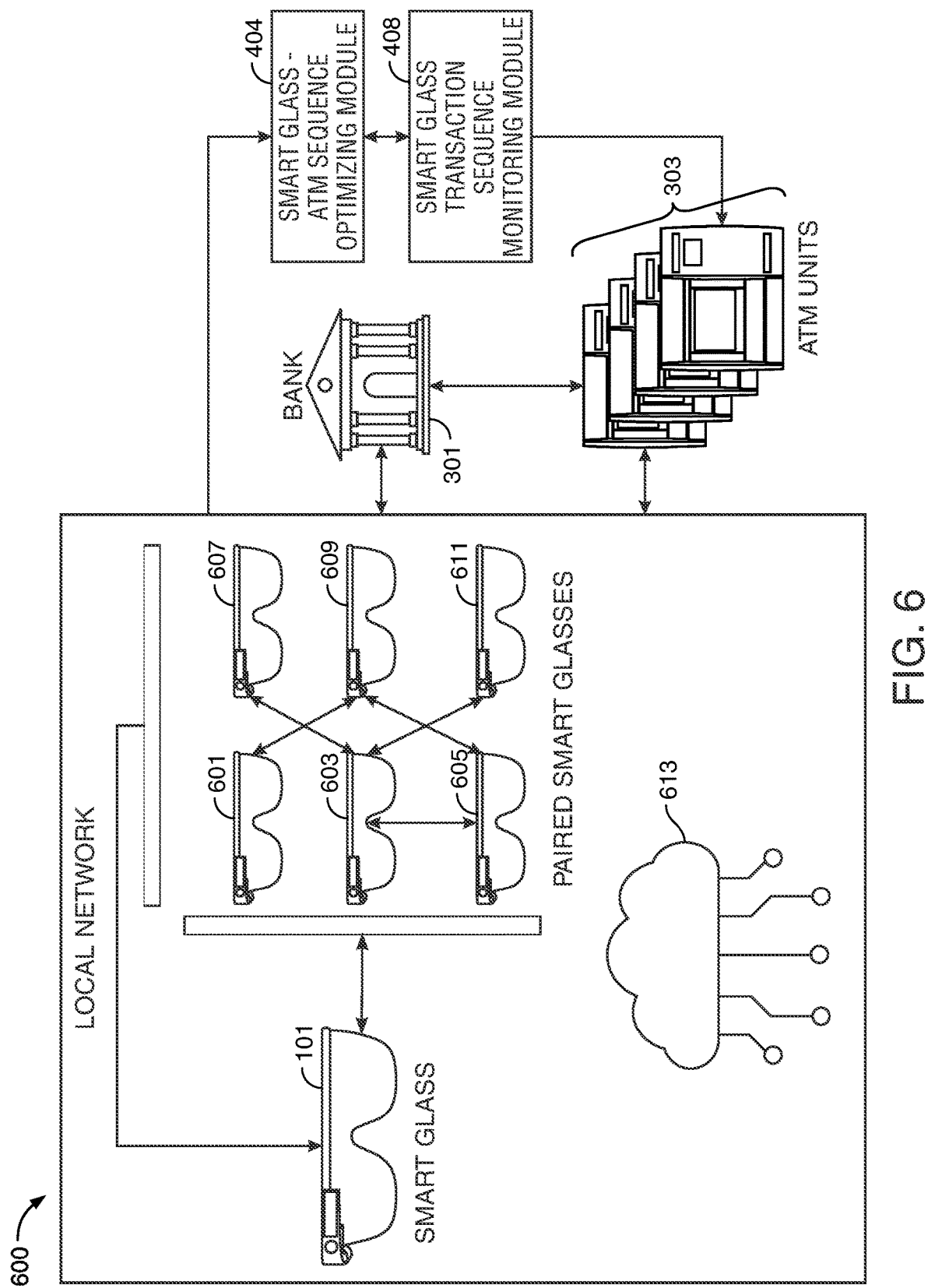
FIG. 6 shows illustrative apparatus and scenario in accordance with the disclosure.

FIG. 6 shows illustrative system architecture 600. System architecture 600 shows that smart glass sequence optimizing module 404 and smart glass transaction sequence monitoring module 408 (operable on smart glasses 101) may receive input from one or more of smart glasses 601, 603, 605, 607, 609, and 611. Each of smart glasses 601, 603, 605, 607, 609, and 611 may be worn by different customers. Smart glasses 601, 603, 605, 607, 609, and 611 may be configured to communicate with each other. Each of smart glasses 601, 603, 605, 607, 609, and 611 may compute a unique operational sequence for the customer wearing one of the smart glasses based on a target action desired input by each customer.

Smart glasses 101 may determine an operational sequence for customer 211 based on information received from one or more of smart glasses 601, 603, 605, 607, 609, and 611. Smart glasses 101 may determine a secondary operational sequence for customer 211 based on information received from one or more of smart glasses 601, 603, 605, 607, 609, and 611. Smart glasses 101 may revise or abort an operational sequence for customer 211 based on information received from one or more of smart glasses 601, 603, 605, 607, 609, and 611.

The information received by one pair of smart glasses may include expected route information associated with an operational sequence being implemented on another pair of smart glasses. The information received may include real-time ATM cash status or travel conditions sensed by one or more of smart glasses 601, 603, 605, 607, 609, and 611.

The information received from one or more of smart glasses 601, 603, 605, 607, 609, and 611 may be utilized by a remote AI engine running on ATM hub 301. The information received from one or more of smart glasses 601, 603, 605, 607, 609, and 611 may be utilized by local AI engine 613 running on a pair of smart glasses. Local AI engine 613 may compute whether to adjustment or abort an operational sequence for a customer wearing a pair of smart glasses.

For example, Local AI engine 613 running on smart glasses 607 may determine that local AI engine 613 running on smart glasses 611 has direct a customer wearing smart glasses 611 to ATM 116 (shown in FIG. 1). Local AI engine 613 running on smart glasses 607 may compute an operational sequence that avoids ATM 116.

Thus, apparatus and methods for SMART GLASS ORCHESTRATION ON CLOSE PROXIMITY ATMS have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An artificial intelligence ("AI") system for linking two or more automated teller machines ("ATMs") to provide synchronized and sequential functionality to a customer, the system comprising:
   smart glasses comprising:
      a heads-up display;
      a microphone that captures a customer instruction to perform a target action;
      a geolocation circuit that determines a target location of the smart glasses at a time the microphone captures the customer instruction;
      a touchpad; and
      a communication circuit for transmitting and receiving encrypted communication signals;
   a network of ATMs, wherein each ATM on the network comprises a local AI engine that inventories functional capabilities of the ATM; and
   a remote computer server comprising a remote AI engine that:
      receives, from the smart glasses, the target location and the target action; and
      based on the target location and functional capabilities of each ATM in the network inventoried by each local AI engine, computes an operational sequence for achieving the target action, wherein the operational sequence utilizes a first ATM in the network to perform a first stage of the target action and a second ATM in the network to perform a second stage of the target action; and
      issues instructions to the heads-up display of the smart glasses that visually guides the customer from the target location to the first ATM and from the first ATM to the second ATM.

2. The AI system of claim 1 wherein the remote AI engine determines the first ATM based on whether there is at least one other ATM within a threshold distance of the first ATM that can perform the first stage of the target action.

3. The AI system of claim 1 wherein the remote AI engine determines the first ATM based on whether there is at least one other ATM within a threshold distance of the second ATM that can perform the first stage of the target action.

4. The AI system of claim 2 wherein the first ATM is not a closest ATM in the network to the target location of the smart glasses.

5. The AI system of claim 1 wherein:
   the local AI engine on the second ATM transmits an update on the functional capabilities of the second ATM; and
   in response to the update, the remote AI engine reroutes the smart glasses to a third ATM instead of the second ATM.

6. The AI system of claim 1 wherein:
   the smart glasses:
      captures authentication information from the customer; and transfers the authentication information to the first ATM;
the local AI engine on the first ATM:
authenticates the customer based on the authentication information received from the smart glasses;
generates a cryptographical key; and
transfers the cryptographical key to the smart glasses and to the second ATM; and
the local AI engine on the second ATM:
receives a request from the smart glasses to access the second ATM;
in response to the request, requests the cryptographical key; and
in response to authenticating the cryptographical key received from the smart glasses, provides the customer access to the second ATM.

7. The AI system of claim 1 wherein the operational sequence for achieving the target action is a primary operational sequence, and the remote AI engine:
determines a secondary operational sequence for achieving the target action;
pushes the primary and the secondary operational sequences to the smart glasses;
initiates execution of the primary operational sequence on the smart glasses; and
in response to a request from the customer, aborts execution of the primary operational sequence and initiates execution of the secondary operational sequence on the smart glasses.

8. The AI system of claim 1 wherein:
the remote AI engine detects that the first stage has been performed at the first ATM performs; and
in response to performance of the first stage, issues instructions to the local AI engine running on the second ATM that restricts any action at the second ATM that will prevent
performance of the second stage of the target action at the second ATM.

9. The AI system of claim 1 wherein, the remote AI engine:
determines an estimated travel time for the customer to progress from the first ATM to the second ATM;
detects a change in circumstances that will cause the customer to exceed the estimated travel time; and
in response to the change in circumstances, reroutes the customer to a third ATM instead of the second ATM.

10. An artificial intelligence ("AI") method for providing a customer with synchronized and sequential functionality to at least two automated teller machine ("ATMs") on a network, the method comprising:
capturing a target action input by the customer using smart glasses;
based on a current geographic position of the smart glasses, determining an operational sequence for achieving the target action, wherein the operational sequence utilizes a first ATM in the network to perform a first stage of target action and a second ATM in the network to perform a second stage of the target action; and
issuing instructions to a heads-up display of the smart glasses that visually guides the customer along a route from the current geographic position to the first ATM and from the first ATM to the second ATM.

11. The AI method of claim 10 wherein determining the operational sequence comprises verifying that the first and second ATMs each have a functional capability to perform the first and second stages of the target action.

12. The AI method of claim 10 further comprising:
determining a first expected time for completing the first stage of the target action;
determining a second expected time for completing the second stage of the target action; and
before issuing the instructions to the heads-up display, verifying that:
the first ATM will have a functional capability to perform the first stage of the target action at the first expected time; and
the second ATM will have a functional capability to perform the second stage of the target action at the second expected time.

13. The AI method of claim 10 further comprising:
after successfully performing the first stage at the first ATM, generating a cryptographic key pair that comprises a public key and a private key;
storing the private key on the smart glasses;
storing the public key on the second ATM;
in response to receiving a request from the smart glasses for access to the second ATM, using the public key to verify the private key stored on the smart glasses; and
in response to successfully verifying the private key, performing the second stage of the target action without requiring the customer to input authentication information at the second ATM.

14. The AI method of claim 13 further comprising:
associating a creation time with the public key; and
rejecting the request from the smart glasses for access to the second ATM when the request is received by the second ATM before a threshold time delay after the creation time.

15. The AI method of claim 10 wherein, determining the operational sequence comprises:
computing a series of checkpoints along the route from the first ATM to the second ATM; and
authenticating the smart glasses as they pass within a threshold distance of each checkpoint in the series;
wherein after successfully authenticating the smart glasses at each checkpoint in the series, performing the second stage of the target action at the second ATM without requiring the customer to provide authentication information to access the second ATM.

16. The AI method of claim 10 further comprising:
replacing the second ATM in the network with a third ATM in the network to perform the second stage of the target action;
and issuing instructions to the heads-up display of the smart glasses that visually guides the customer from the first ATM to the third ATM.

17. The AI method of claim 16 further comprising:
determining an estimated travel time for the customer to progress from the first ATM to the second ATM;
detecting a change in circumstances that will cause the customer to exceed the estimated travel time; and
in response to the change in circumstances, replacing the second ATM in the operational sequence with the third ATM.

18. A non-transitory computer readable medium storing an artificial intelligence ("AI") software engine for providing a customer with synchronized and sequential functionality to at least two automated teller machine ("ATMs") on a network, the AI software engine comprising computer executable instructions, that when executed on a processor:
receive a customer command to perform a target action;
generate an operational sequence that utilizes two or more ATMs to perform the target action;

determine an estimated travel time for the customer to visit the at least two ATMs and complete the target action;

detect a change in circumstances that will cause the customer to exceed the estimated travel time; and in response to detecting the change in circumstances, changing the operational sequence.

19. The non-transitory computer readable medium of claim 18, further comprising computer executable instructions, that when executed on the processor:

require the customer to input authentication information to access a first ATM in the operational sequence; and in response to successfully authenticating the customer at the first ATM, authenticating the customer at a second ATM in the operational sequence without requiring the customer to input authentication information at the second ATM.

20. The non-transitory computer readable medium of claim 18, further comprising computer executable instructions, that when executed on the processor, generate the operational sequence based on:

cash availability at each of the ATMs on the network;

time to cash replenishment at each of the ATMs on the network; and technical health parameters of each of the ATMs on the network.

* * * * *